(12) United States Patent
Hewitt

(10) Patent No.: US 6,928,528 B1
(45) Date of Patent: Aug. 9, 2005

(54) GUARANTEED DATA SYNCHRONIZATION

(75) Inventor: Larry D. Hewitt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 300 days.

(21) Appl. No.: 10/266,118

(22) Filed: Oct. 7, 2002

(51) Int. Cl.[7] ............................................. G06F 12/06
(52) U.S. Cl. ....................... 711/156; 710/52
(58) Field of Search ................. 711/154, 155, 156, 711/103; 710/310; 370/503

(56) References Cited

U.S. PATENT DOCUMENTS

| | | | |
|---|---|---|---|
| 5,294,983 A * | 3/1994 | Ersoz et al. ................. | 348/521 |
| 5,497,200 A * | 3/1996 | Otaki et al. .................. | 348/497 |
| 5,918,073 A * | 6/1999 | Hewitt .......................... | 710/52 |
| 6,161,160 A * | 12/2000 | Niu et al. ..................... | 710/310 |
| 6,635,518 B2 * | 10/2003 | Aipperspach et al. ....... | 438/151 |
| 6,661,884 B2 * | 12/2003 | Shaffer et al. .......... | 379/201.02 |
| 6,728,492 B1 | 4/2004 | Baroncelli | |
| 6,751,235 B1 * | 6/2004 | Susnow et al. ............. | 370/503 |
| 6,757,763 B1 | 6/2004 | Preiss et al. | |
| 6,763,477 B1 | 7/2004 | McGee | |

FOREIGN PATENT DOCUMENTS

WO    WO 97/26010     7/1997

OTHER PUBLICATIONS

Coppola, R. et al., "Characterization of a CA (II)-Independent Monoclonal Antibody that Lacks Reactivity with GLA-Domainless Human Factor VII,"*Thrombosis Research* 68:269-281 (1992).

Parsson, E. et al., "Structurally and Functionally Distinct $Ca^{2+}$ Binding Sites in the γ-Carboxyglutamic Acid-Containing Domain of Factor VIIa,"*J. Biochem.* 234:293-300 (1995).

Römisch, J. et al., "Characteristics and Use of a Monoclonal Antibody Specific for Activated Factor VII,"*Blood* 92:99B (1998) (Abstract 3408).

Römisch, J. et al., "A Monoclonal Antibody Specific for Activated Factor VII: Characteristics and Use,"*Annals of Hematology* 76:A50 (1998) (Abstract P91).

* cited by examiner

*Primary Examiner*—Pierre-Michel Bataille
(74) *Attorney, Agent, or Firm*—Meyertons Hood Kivlin Kowert & Goetzel, P.C.; B. Noël Kivlin

(57) ABSTRACT

A method and apparatus for guaranteed data synchronization. In one embodiment, a data synchronization unit includes a memory unit, a write pointer unit, a read pointer unit, and synchronization pulse logic. The memory unit may receive information from a source external to the data synchronization unit. The write pointer may specify an address within the memory where incoming information is to be written. A read pointer outgoing information is to be read from. The data synchronization unit may also include synchronization pulse logic. The synchronization pulse logic may be configured to, in a synchronization mode, to generate a synchronization pulse. In response to an assertion of the synchronization pulse, the read pointer may be initialized such that data read out of the memory unit is valid (i.e. guaranteed to meet electrical requirements) at that time.

36 Claims, 6 Drawing Sheets

GUARANTEED DATA SYNCHRONIZATION

BACKGROUND OF THE INVENTION

1. Field of the Invention

This invention relates to the transferring of information in an electronic circuit, and more particularly, to the synchronization of information transferred between different clock domains.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

With multiple processors, multiple I/O devices, and multiple I/O bridges may come multiple clock domains. Often times, the clock frequencies required for operation of the processor, the I/O bridges, and the peripheral devices (and buses that couple these elements together) are different. Furthermore, it is often times possible the within a processor or an I/O bridge, multiple functional units may be present which require differing clock frequencies. In such cases, multiple clocks may be provided, with the clock signals being routed to their respective domains. Often times, individual integrated circuits (ICs) may have multiple clock domains. Such ICs may include processors, chipset ICs, and other types.

In systems having multiple clock domains, it is often necessary to transmit information from one domain to another. However, this is not a straightforward process when the clock frequencies from one domain to another are different. Often times in such cases, a technique known as handshaking is used. Handshaking may involve a communication between two clock domains wherein an agreement is reached on when data may be sent. This may ensure that a faster domain does not overwhelm a slower domain by exceeding the maximum bandwidth of the slower domain. Similarly, handshaking may ensure that a slower device may utilize as much of the bandwidth of a faster domain as possible when the faster domain is receiving information.

As noted above, some ICs may have multiple clock domains. Before these ICs may be used in a system, they are often times tested to ensure functionality and reliability. The ICs may be tested on a production test system. During the testing of such ICs, timing variations resulting from variations in process (i.e. the manufacturing process), voltage, and temperature may be introduced. These timing variations may affect the reading of data that is produced responsive to input test vectors when data is transferred from one clock domain to another. Data produced by an IC responsive to the inputting of test vectors must be synchronized in order to sure it is read by the tester at the appropriate time. In some cases, data produced responsive to inputting test vectors may be read by the test system at inappropriate times due to these timing variations. This problem may be referred to as cycle slippage, and ICs having multiple clock domains may be particularly vulnerable. Reading the data at inappropriate times may cause an otherwise good part to fail when tested. These false failures may in turn lead to good parts being scrapped and the resultant cost of replacement parts.

SUMMARY OF THE INVENTION

A method and apparatus for guaranteed data synchronization is disclosed. In one embodiment, a data synchronization unit includes a memory unit, a write pointer unit, a read pointer unit, and synchronization pulse logic. The memory unit may include a memory for temporary storage of information received by the data synchronization unit. The memory unit may be configured to receive information received from a source external to the data synchronization unit. The write pointer may be operatively coupled to the memory, and may specify an address within the memory where incoming information is to be written. The write pointer may be configured to receive a clock signal that may be generated external to the data synchronization unit and transmitted with the data (i.e. the data is synchronized to the external clock signal). A read pointer may also be operatively coupled to the memory, and may specify an address where outgoing information is to be read from. The read pointer may be configured to receive a local clock signal that may be generated internal to the data synchronization unit. The data synchronization unit may also include synchronization pulse logic. The synchronization pulse logic may be configured to, in a synchronization mode, to generate a synchronization pulse. In response to an assertion of the synchronization pulse, the read pointer may be initialized such that data read out of the memory unit is valid (i.e. guaranteed to meet electrical requirements) at that time.

The method and apparatus may guarantee a pre-defined relationship between the writing and reading of data to and from the FIFO. This pre-defined relationship may be repeatable for multiple units of an integrated circuit design in which the data synchronization unit is implemented. Thus, method and apparatus may be useful in an integrated circuit test environment by enabling test programs to be written with a knowledge of the relationship between the writing and reading of data prior to conducting any actual testing. Multiple units of the integrated circuit implementing the synchronization unit may be powered up into a state where this relationship is the same for each unit.

In one embodiment, the memory may be a FIFO (first-in first-out) memory. Information may be read out from the FIFO memory in the same order in which it was written. Selection of the addresses where information is to be written and read from may be controlled by the write and read pointers, respectively. The write and read pointers may be implemented as counters or another type of state machine that includes a sufficient number of states for proper addressing.

Synchronization may include resetting the read pointer, which may be configured to receive the local clock signal. The synchronization pulse logic may periodically assert a synchronization pulse. This assertion of the synchronization pulse may occur once for each of a predetermined number of clock cycles. Assertion of the synchronization pulse may cause the read pointer to be reset, thereby guaranteeing that the data is valid when read out of the memory. The data may be considered to be valid when electrical requirements of setup and hold time are sufficient for proper reading. Both the write and read pointers may include a certain number of states, which correspond to the number of locations in the memory. In one embodiment, the write and read pointers each include 8 states. The state of either pointer may correspond to the location that it is writing to/reading from. Asserting the synchronization pulse may ensure that the read pointer causes data to be read at a certain number of locations behind where the write pointer is writing data. For example, an assertion of the synchronization pulse may reset the read pointer such that data is being from location 0 in the memory while the data is being written to location 4. Thus, since the reading of data, as controlled by the read pointer, lags the writing of data by 4 locations, the data being read is guaranteed to meet setup and hold requirements. Furthermore, the design of the synchronization unit may be configured to guarantee that the reading of data from the FIFO lags the writing of data by a pre-defined number of locations (e.g. 4, as in the example above, or another number for other embodiments) for each unit of an integrated circuit powered up on an integrated circuit tester.

The guaranteed data synchronization may occur in a synchronization mode. The synchronization mode may be enabled when it is necessary to ensure that data is read from the memory a certain number of locations (and thus pointer cycles) behind when it is written. The synchronization mode may be useful when it is desired to prevent the effects of clock cycle slippage from affecting data transmissions. For example, the synchronization mode may be particularly useful during the testing of an integrated circuit in which the data synchronization unit is implemented, as it may ensure that responses to test vectors have sufficient setup and hold time to be properly read, and are read at the proper times. Operating in the synchronization mode may also ensure that each unit of a specific integrated circuit design will power up with a known relationship on an integrated circuit tester, thereby allowing test programs to be written with test vectors based on this known relationship.

BRIEF DESCRIPTION OF THE DRAWINGS

Other aspects of the invention will become apparent upon reading the following detailed description and upon reference to the accompanying drawings in which.

Figure 1:
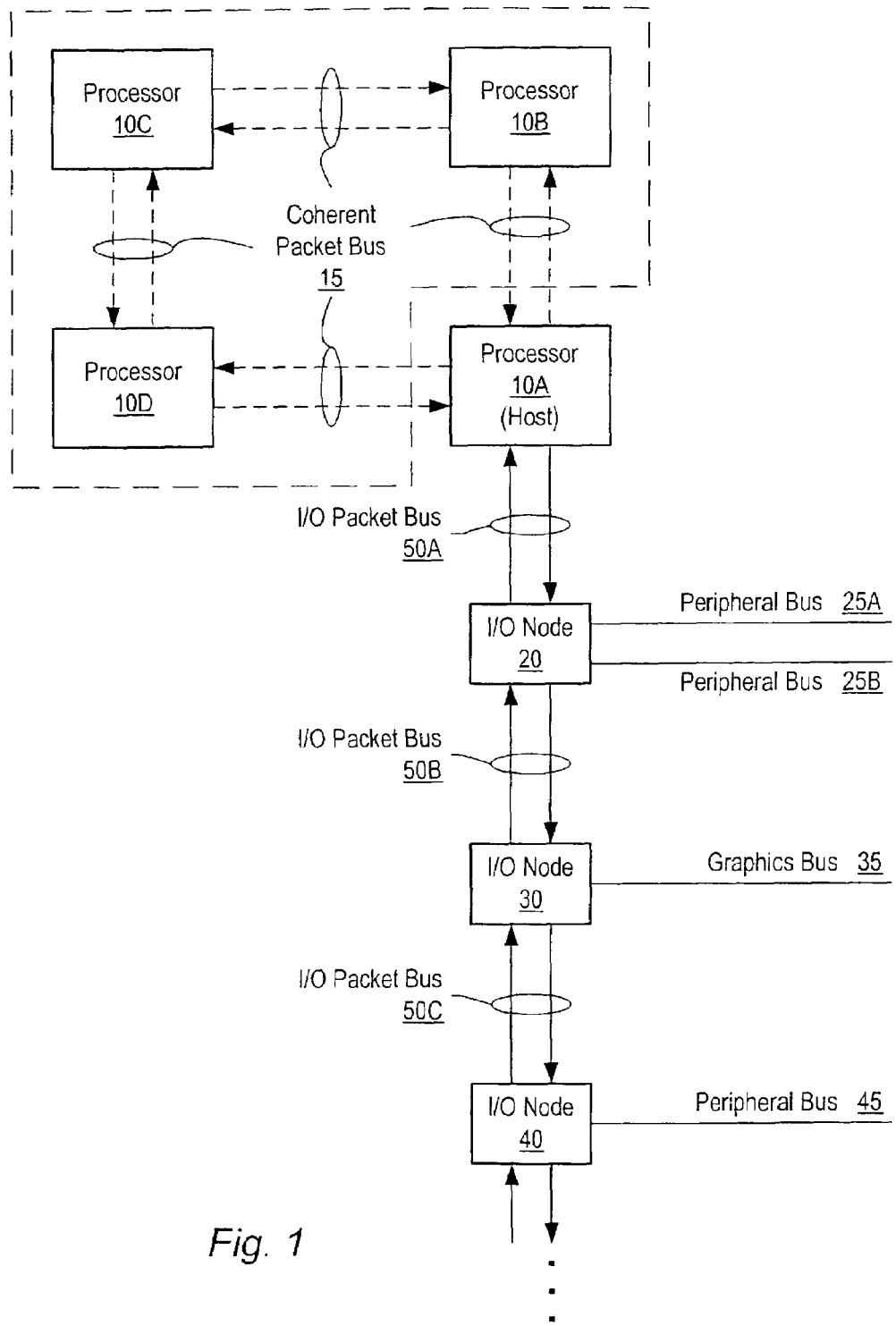
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a computer system is shown. The computer system includes processors 10A–10D each interconnected by a coherent packet bus 15. Each section of coherent packet bus 15 may form a point-to-point link between each of processors 10A–D. While four processors are shown using point-to-point links it is noted that other numbers of processors may be used and other types of buses may interconnect them. The computer system also includes three I/O nodes numbered 20, 30 and 40 each connected together in a chain by I/O packet buses 50B and 50C respectively. I/O packet bus 50A is coupled between host node/processor 10A and I/O node 20. Processor 10A is illustrated as a host node which may include a host bridge for communicating with I/O packet bus 50A. Processors 10B–D may also include host bridges for communication with other I/O packet buses (not shown). The communication links formed by I/O packet bus 50A–C may also be referred to as a point-to-point links. I/O node 20 is connected to a pair of peripheral buses 25A–B. I/O node 30 is connected to a graphics bus 35, while I/O node 40 is connected to an additional peripheral bus 45.

Processors 10A–10D are each illustrative of, for example, an x86 microprocessor such as an Athlon™ microprocessor. In addition, one example of a packet bus such as I/O packet bus 50A–50C may be a non-coherent HyperTransport™. Peripheral buses 25A–B and peripheral bus 45 are illustrative of a common peripheral bus such as a peripheral component interconnect (PCI) bus. Graphics bus 35 is illustrative of an accelerated graphics port (AGP), for example. It is understood, however, that other types of microprocessors and other types of peripheral buses may be used.

It is noted that while three I/O nodes are shown connected to host processor 10A, other embodiments may have other numbers of nodes and those nodes may be connected in other topologies. The chain topology illustrated in FIG. 1 is shown for its ease of understanding.

In the illustrated embodiment, the host bridge of processor 10A may receive upstream packet transactions from downstream nodes such as I/O node 20, 30 or 40. Alternatively, the host bridge of processor 10A may transmit packets downstream to devices such as peripheral devices (not shown) that may be connected to peripheral bus 25A for example.

During operation, I/O node 20 and 40 may translate PCI bus transactions into upstream packet transactions that travel in I/O streams and additionally may translate downstream packet transactions into PCI bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. As used herein, "upstream" refers to packet traffic flow in the direction of the host bridge of processor 10A and "downstream" refers to packet traffic flow in the direction away from the host bridge of processor 10A. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device on peripheral bus 45 initiates a transaction directed to a peripheral device on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. Since I/O node 20 may not forward packets to a peripheral device on peripheral bus 25 from downstream, the packets are transmitted upstream to the host bridge of processor 10A. The host bridge of processor 10A may then transmit the packets back downstream with a Unit ID of the host bridge of processor 10A until I/O node 20 recognizes and claims the packet for the peripheral device on peripheral bus 25. I/O node 20 may then translate the packets into peripheral bus transactions and transmit the transactions to the peripheral device on peripheral bus 25.

As the packet transactions travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular I/O node and is inserted into the upstream traffic is referred to as "injected" traffic.

As will be described in greater detail below, to preserve the ordering rules of the various buses that may be connected to an I/O node, the I/O node may provide transaction reordering as well as packet buffering. The I/O node may also include control logic which controls the flow of packets into and out of the tunnel by both forwarded and injected traffic.

Figure 2:
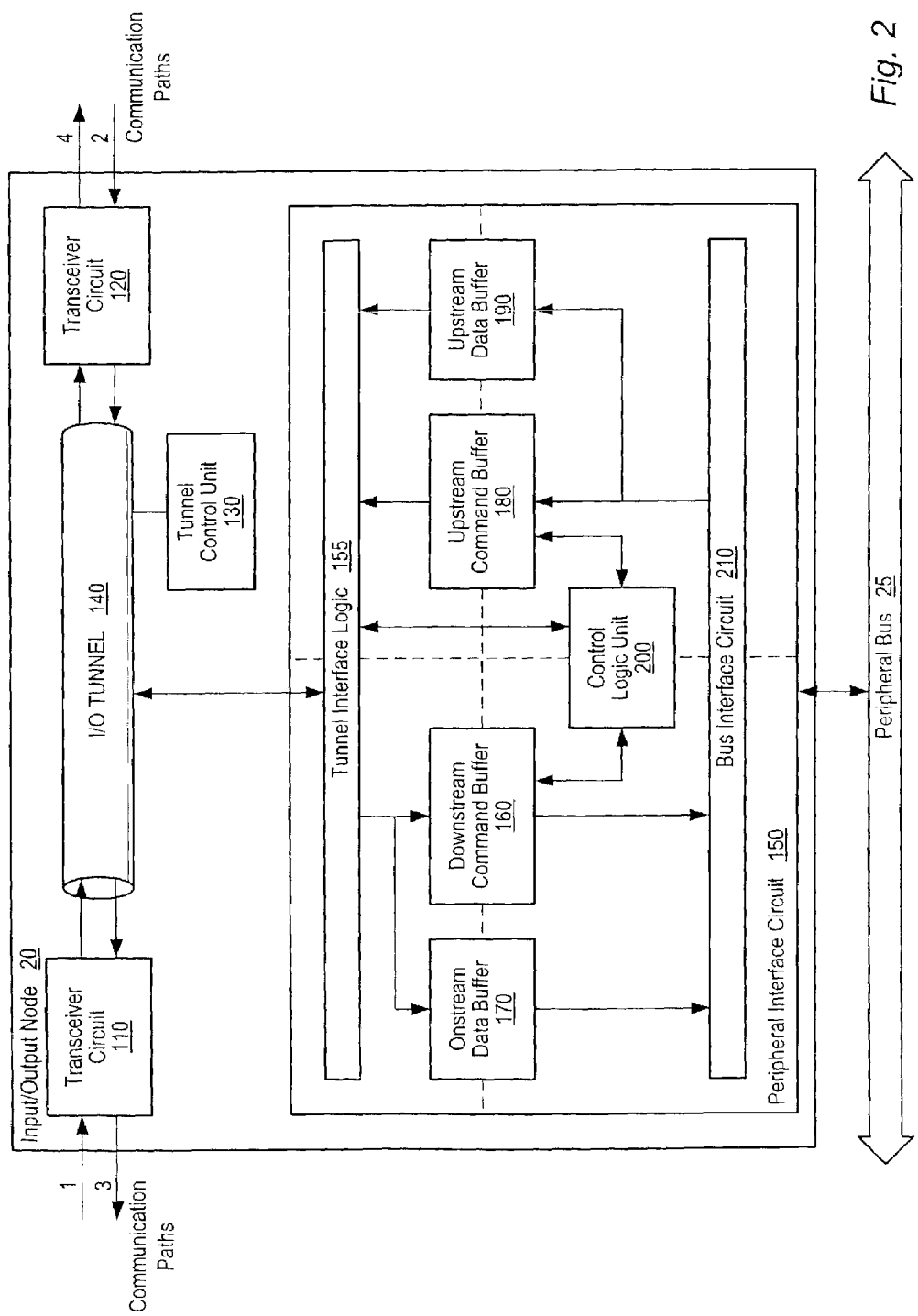
FIG. 2 is a block diagram of one embodiment of an I/O node.

Referring to FIG. 2, a block diagram of one embodiment of an input/output (I/O) node is shown. This particular description will refer to I/O node 20 for simplicity, but it should be noted that the description may apply as well to any of the I/O nodes shown in FIG. 1. Input/output node 20 includes an upstream packet bus interface and a downstream packet bus interface, implemented in this embodiment as transceiver circuit 110 and transceiver circuit 120, respectively. Transceiver circuits 110 and 120 are coupled together through an I/O tunnel 140. Transceiver circuits 110 and 120 may each include a transmitter and a receiver (not shown). The transmitters and receivers may be connected through I/O tunnel 140 such that the receiver of transceiver 110 may be coupled to the transmitter of transceiver 120 and the receiver of transceiver 120 may be coupled to the transmitter of transceiver 110. I/O tunnel 140 may include command and data buses used to forward packet traffic through I/O node 20. In addition, I/O node 20 includes a peripheral bus interface, implemented here as peripheral interface circuit 150. Peripheral interface circuit 150 is coupled to transceivers 110 and 120 through I/O tunnel 140. However as described above, transactions which originate at peripheral interface circuit 150 and then enter I/O tunnel 140 may be referred to as injected transactions. I/O node 20 also includes a tunnel control unit 130 which is coupled to control the transactions between transceivers 110 and 120 and peripheral interface 150. I/O node 20 is also coupled to a peripheral bus 25 through the peripheral interface circuit 150.

In the illustrated embodiment, transceivers 110 and 120 are part of two uni-directional communication paths through I/O tunnel 140. Since each of the communication paths is unidirectional, either path may be connected as the upstream or downstream path. Thus, the injected traffic from peripheral interface circuit 150 may be provided to either of transceivers 110 and 120. Transceivers 110 and 120 may each receive packet transactions into a receive buffer (not shown). As each transaction is received, a control command may be generated containing a subset of the information contained in the received command. The control command may include the Unit Id of the originating node, destination information, a data count and transaction type, for example. It is noted that the control command may include other information or may not include some of the information listed here. The control command may be sent from transceivers 110 and 120 to tunnel control unit 130. Tunnel control unit 130 may further determine which of the received transactions may be sent from a respective transceiver and to indicate to the transceiver to send the transaction to the transaction's destination.

In the illustrated embodiment, peripheral interface circuit 150 may be thought of as having a downstream section and an upstream section. The downstream section may handle downstream transactions whose destination may be a device connected to peripheral bus 25. Packets received by the downstream section may allow peripheral bus interface circuit to generate cycles on the peripheral bus, enabling communication with peripheral devices coupled to the bus. The upstream section may handle transactions which originate from devices that may be connected to peripheral bus 25. Thus, peripheral interface circuit 150 includes a downstream command buffer 160 and a downstream data buffer 170, each coupled to I/O tunnel 140 via tunnel interface logic 155. Downstream command buffer 160 and downstream data buffer 170 are each coupled to peripheral bus 25 via bus interface circuit 210. Peripheral interface circuit 150 also includes an upstream command buffer 160 and an upstream data buffer 190, each coupled to I/O tunnel 140 via tunnel interface logic 155. Upstream command buffer 160 and upstream data buffer 170 are also each coupled to peripheral bus 25 via bus interface circuit 210. Peripheral interface circuit 150 further includes a control logic unit 200 which is coupled to both upstream command buffer 180 and downstream command buffer 160.

It is noted that in the illustrated embodiment, peripheral bus 25 is illustrative of a variety of common peripheral buses such as a PCI bus, a PCI-X bus and an AGP bus for example. Additionally, bus interface circuit 210 may include circuitry for translating peripheral bus commands from such buses. Further, it is contemplated that in one particular embodiment, bus interface circuit 210 may be a bus interface such as a Compaq™ Rapid Enabler for PCI-X (CREX) interface. Lastly, it is contemplated that in certain embodiments, I/O node 20 may include more than one peripheral interface circuit (not shown) and that I/O node may include arbitration logic (not shown) which may arbitrate between commands sent from each of the peripheral interface circuits.

Transactions may be sent from transceiver circuit 110 or 120 depending on which transceiver is connected as the downstream receiver. The command portion of the transaction may be stored in downstream command buffer 160 and the data portion of the transaction may be stored in downstream data buffer 170. Likewise, when a transaction is sent from bus interface circuit 210, the command portion of the transaction may be stored in upstream command buffer 180 and the data portion of the transaction may be stored in upstream data buffer 190. Control logic unit 200 may be configured to control the conveyance of the transactions to and from bus interface 210 and I/O tunnel 140.

In response to peripheral interface circuit 150 receiving upstream transactions from peripheral bus 25, control logic unit 200 may generate control commands similar to the control commands generated by transceivers 110 and 120. Control logic unit 200 may also send those control commands to tunnel control unit 130, thus allowing upstream commands to be scheduled into I/O tunnel 140. In addition, control logic unit 200 may provide downstream circuitry with signals corresponding to upstream commands which may allow the downstream circuitry to maintain the relative order of downstream response transactions.

Figure 3:
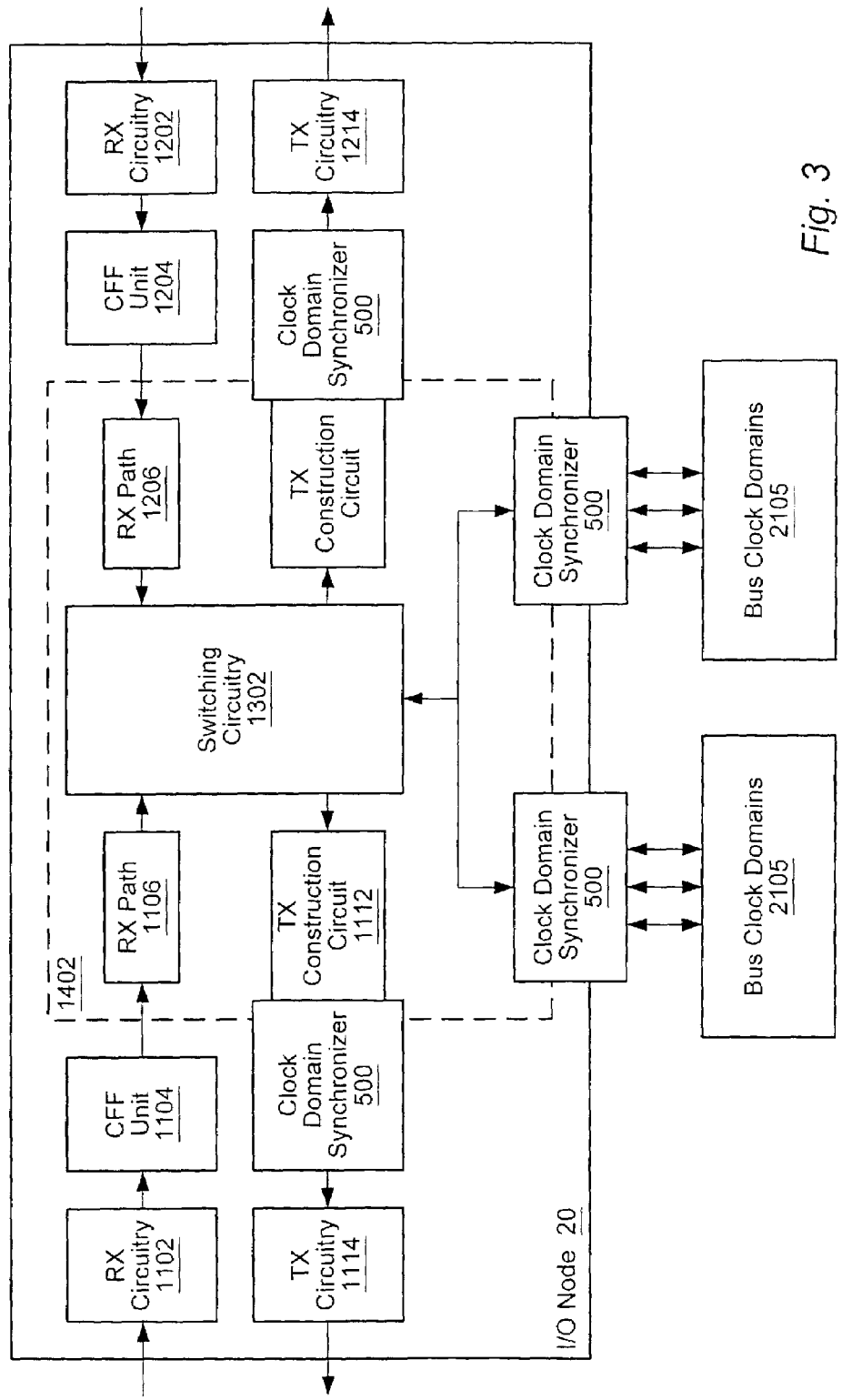
FIG. 3 is an alternate block diagram of the embodiment of the I/O node illustrated in FIG. 2, wherein the alternate block diagram illustrates the multiple clock domains.

FIG. 3 is an alternate block diagram of the embodiment of the I/O node illustrated in FIG. 2, illustrating multiple clock domains. I/O node 20 includes a plurality of clock domains, wherein each of the clock domains may be synchronized to a clock having a different frequency than adjacent clock domains. Clock domain 1402 serves as the clock domain for I/O tunnel 140. Switching circuitry 1302 may reside within clock domain 1402, and may be a component of tunnel control unit 130.

Data to be transmitted in packets from I/O node 20 may be conveyed from switching circuitry 1302 into one of transmit (TX) construction circuits 1112 or 1212. In the embodiment shown, TX construction circuit 1112 is a component of transceiver circuit 110, while TX construction circuit 1212 is a component of transceiver circuit 120. TX construction circuits 1112 and 1212 may be configured to organize data into packets or perform other functions necessary for transmitting information from I/O node 20. In embodiments where the width of the packet bus is less than that of buses internal to I/O node 20, TX construction circuit may perform a wide-to-narrow conversion of the packets.

Once packets are ready for transmission, it may be necessary to transfer them to the clock domain of TX circuitry 1114 or 1214. Since these transmit circuits may be in clock domains different from I/O tunnel clock domain 1402, it may be necessary to route the packets through a corresponding clock domain synchronizer 500. Clock domain synchronizers 500 may be configured to "shift" the packets into a clock domain with a faster or slower clock frequency than that of clock domain 1402. Clock domain synchronizers 500 will be discussed in further detail below.

Packets may be transmitted onto a packet bus link through TX circuitry 1114 or 1214, depending upon the link. TX circuitry 1114/1214 may include circuitry for transmitting packet signals onto a packet bus link, as well as any necessary timing circuitry. Control circuitry may also be present, as transmissions onto the packet bus may be subject to arbitration. In addition, TX circuitry 1114/1214 may further include buffers or registers in order to store packets awaiting transmission onto the packet bus.

Packetized data and commands from a packet bus link coupled to I/O node 20 may be received through receive (RX) circuitry 1102/1202, data synchronization units (shown here as CFF units 1104/1204), and RX paths 1106/1206. Switching circuitry 1302 may receive the packets from either of RX paths 1106/1206, and route the packets to a TX construction circuit 1112/1212 (for packets passing through I/O node 20 to another packet bus link) or to a peripheral bus interface, such as peripheral interface circuit 150 of FIG. 2.

In one embodiment, RX circuitry 1102/1202 may perform narrow-to-wide bus conversions. The packet bus links coupled to I/O node 20 may be narrower than the signal width of buses internal to the I/O node. Thus, RX circuitry 1102/1202 may convert packets received on a narrow packet bus link to a format suitable for a wider internal bus link.

After conversion, data and/or commands may be forwarded by RX circuitry 1102/1202 to a corresponding data synchronization unit. In the embodiment shown, the data synchronization units are clock-forwarding FIFO (first in first out) units 1104/1204. CFF units 1104/1204 may be configured to control the flow of information from the packet bus link into I/O node 20 by providing buffering and clock synchronization between clock domains. CFF units 1104/1204 may be sized to absorb dynamic variation between a transmitter's clock (external to I/O node 20) and the receiver's clock (generated internal to I/O node 20). Because of variations in manufacturing process, voltage, and temperature, it is possible for clock cycle slippage to occur between different I/O nodes in a computer system. This may occur when the transmitter clock and the receiver clock are synchronized in frequency but not in phase. CFF units 1104/1204 may absorb these variations by temporarily storing information received from RX circuitry 1102/1202 in a first in first out (FIFO) memory. This may allow for the receiving of information by I/O node 20 from a packet bus link despite any accumulated phase difference between external and internal clocks.

Each of CFF units 1104/1204 may also, in some embodiments, perform a function similar to that of the clock domain synchronizers 500. The presence of a FIFO memory in CFF units 1104/1204 may allow information to be received by a slower clock domain from a faster clock domain, as the FIFO may also absorb any frequency variation. CFF units 1104/1204 will be discussed in further detail below.

Information from each of the CFF units may pass through an RX path 1106/1206 into switching circuitry 1302. RX paths 1106/1206 may be a bus configured to convey information into the switching circuitry. The bus may be sized to match the data width of a FIFO output from CFF units 1104/1204.

I/O node 20 may also include bus clock domains 1505 and 1506. Bus clock domains 1505 and 1506 may each include a plurality of clock domains which correspond to bus interfaces. Such bus interfaces may be configured to support peripheral buses such as a peripheral component interface (PCI) bus, an advanced graphics port (AGB) bus, a general purpose instrument bus (GPIB), and any other type of peripheral bus. Internal buses may also be coupled to a bus interface in one of bus clock domains 1505/1506. Corresponding clock domain synchronizers 500, as shown in the drawing, may allow information to be transmitted between bus clock domains 1505/1506 and clock domain 1402. In the embodiment shown, bus clock domains 1505/1506 may each correspond to a peripheral bus interface such as peripheral interface circuit 150 of FIG. 2. It should also be noted that multiple clock domains may be present within each of bus clock domains 1505/1506.

Switching circuitry 1302 may perform a variety of switching functions related to the routing of information that may pass through I/O node 20. Switching circuitry 1302 may include circuitry which routes information between the bus clock domains and the transmit and receive paths shown in the drawing (made up of RX circuitry 1102/1202, TX circuitry 1114/1214, etc.).

Figure 4:
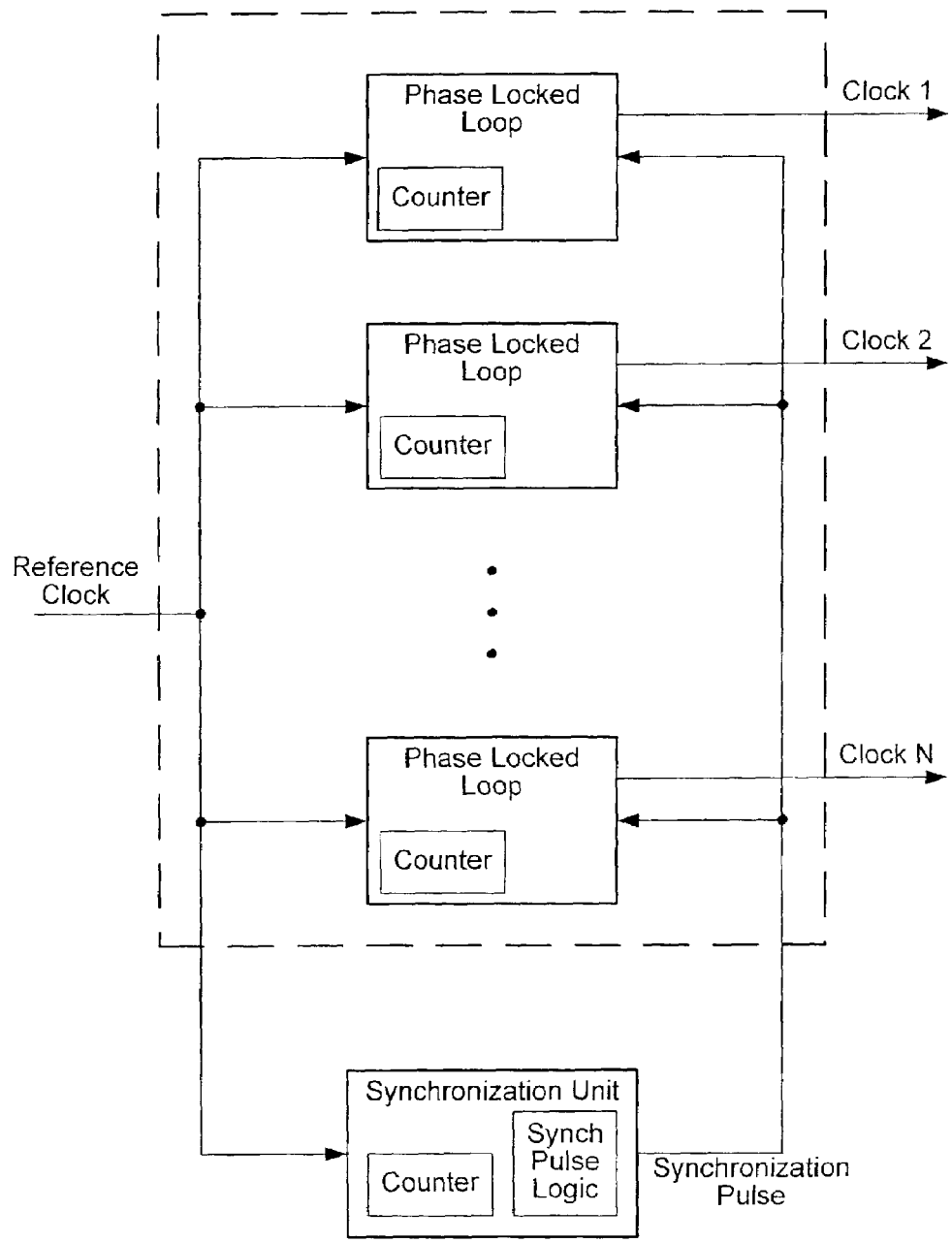
FIG. 4 is a block diagram of one embodiment of a circuit configured to perform edge synchronization for multiple clock signals.

Turning now to FIG. 4, a block diagram of one embodiment of a circuit configured to perform edge synchronization for multiple clock signals is shown. Clock circuit 501 may be a component of clock domain synchronizer 500 shown in FIG. 3. Clock circuit 501 may include a clock unit 502 and a synchronization circuit 520. Clock unit 501 may include a plurality of phase locked loops (PLLs) 503. The output of each of PLLs 503 may be a clock signal, which may be conveyed to a clock domain in the system in which clock circuit 501 is implemented (such as I/O node 20). Clock unit 502 may output n clock signals, wherein n is an integer value. There is no theoretical limit to the number of PLLs 503 that may be present in clock unit 502, and consequently, the number of clock signals which it may produce. It should also be noted that other embodiments utilizing delay locked loops (DLLs) are possible and contemplated.

Each of PLLs 503 may receive a reference clock signal, and as previously noted, produce an output clock signal. In embodiments such as I/O node 20 of FIGS. 2 and 3, the reference clock signal may be a signal produced external to the I/O node, while the output clock signals (clock 1, clock 2, etc.) may be local clock signals for one of the clock domains. The output clock signal from each of PLLs 503 may have a frequency that is greater than or less than the frequency of the reference clock signal. It may also be possible for the output clock signal of a given PLL 503 to have a frequency that is equal to the frequency of the reference clock signal.

In the embodiment shown, each of PLL 503 may be a typical PLL including a phase detector and a voltage controlled oscillator (VCO). Each PLL 503 may also include a divide-by-n counter, shown here as counter 512 in each of PLLs 503. Counters 512 may each be placed in a feedback path between the VCO and phase detector. This may enable a given PLL 503 to output a clock signal having a frequency that is a multiple of the reference clock signal. Conversely, depending upon the counter, the frequency of the output clock signal may be a fraction of the input clock signal. Thus, multiple clock signals having different frequencies may be produced by clock unit 502 using the reference clock signal as an input to each of the PLLs 503.

Synchronization unit 520 may also be configured to receive the reference clock signal, and may be further configured to drive a synchronization pulse to each of PLLs 503. In the embodiment shown, synchronization unit 520 includes counter 522 and synchronization pulse logic 524. Counter 522 may be configured to receive the reference clock signal, and may cycle through a plurality of states.

Synchronization pulse logic 524 may be coupled to counter 522 and may assert a synchronization pulse each time the counter cycles through a number of states N. In one embodiment, the assertion of the synchronization pulse may occur once every N clock cycles of the reference clock signal. The beat frequency may be defined as the frequency in which a given pattern of all of the clock cycles repeats itself. In one embodiment, the beat frequency of the repeating clock patterns may be N times the frequency of the reference clock signal. For example, if the reference clock signal is 200 MHz, and the pattern repeats itself at 4 times the rate of the reference clock signal, then N=4 and the beat frequency is 800 MHz. Other embodiments are possible and contemplated wherein the beat frequency may be less than the frequency of the reference clock signal.

The outputs of counter 522 may be coupled to synchronization pulse logic 524. In one embodiment, synchronization pulse logic 524 may be a combinational logic circuit. When the outputs of counter 522 reach a certain state, it may cause the synchronization pulse to be asserted. The synchronization pulse may be driven to each of the PLLs 503. In addition, the synchronization pulse may be fed back to a reset input of counter 522, which may cause the counter to be reset each time the synchronization pulse is asserted.

The synchronization pulse may also be received by each counter 512 within its respective PLL 503. In particular, each counter 512 may receive the synchronization input through a reset input. Receiving the asserted synchronization pulse at the reset input may cause each of counters 512 to asynchronously reset. When each of counters 512 is reset, it may cause its respective PLL 503 to attain a phase lock on a subsequent clock edge of the reference clock signal. In one embodiment, each PLL 503 may attain a phase lock on the next rising edge of the reference clock signal subsequent to the resetting of counters 512. Thus, each PLL 503 may achieve a phase lock at approximately the same time, thereby aligning the rising edges of all of the clock signals.

It should be noted that other embodiments are possible and contemplated wherein the falling edges of the clock signals are aligned instead of the rising edges. This may be true for systems having synchronous logic circuits that are triggered by a falling edge of a clock signal instead of the rising edge. Furthermore, systems having a mix of synchronous circuits triggered by either the rising edges or the falling edges of a clock signal may be configured to perform alignment of either rising edges or falling edges.

By achieving phase lock for each of PLLs 503 subsequent to the assertion of the synchronization pulse, the relationship between the clock edges may be known at a given instant. Knowledge of this relationship may be critical when information is to be transferred between clock domains wherein the respective clock signals involved have different frequencies. When information is transferred between clock domains synchronized to clock signals of different frequencies, only certain "safe" clock cycles may be suitable for information transmission. Thus, to ensure that the transmissions occur during safe clock cycles, it may be of critical importance to know the relationship between the edges of the clock signals involved. Thus, by periodically asserting the synchronization pulse, the clock edges may be aligned in a repetitious fashion during the operation of a system in which clock circuit 501 is implemented.

Figure 5:
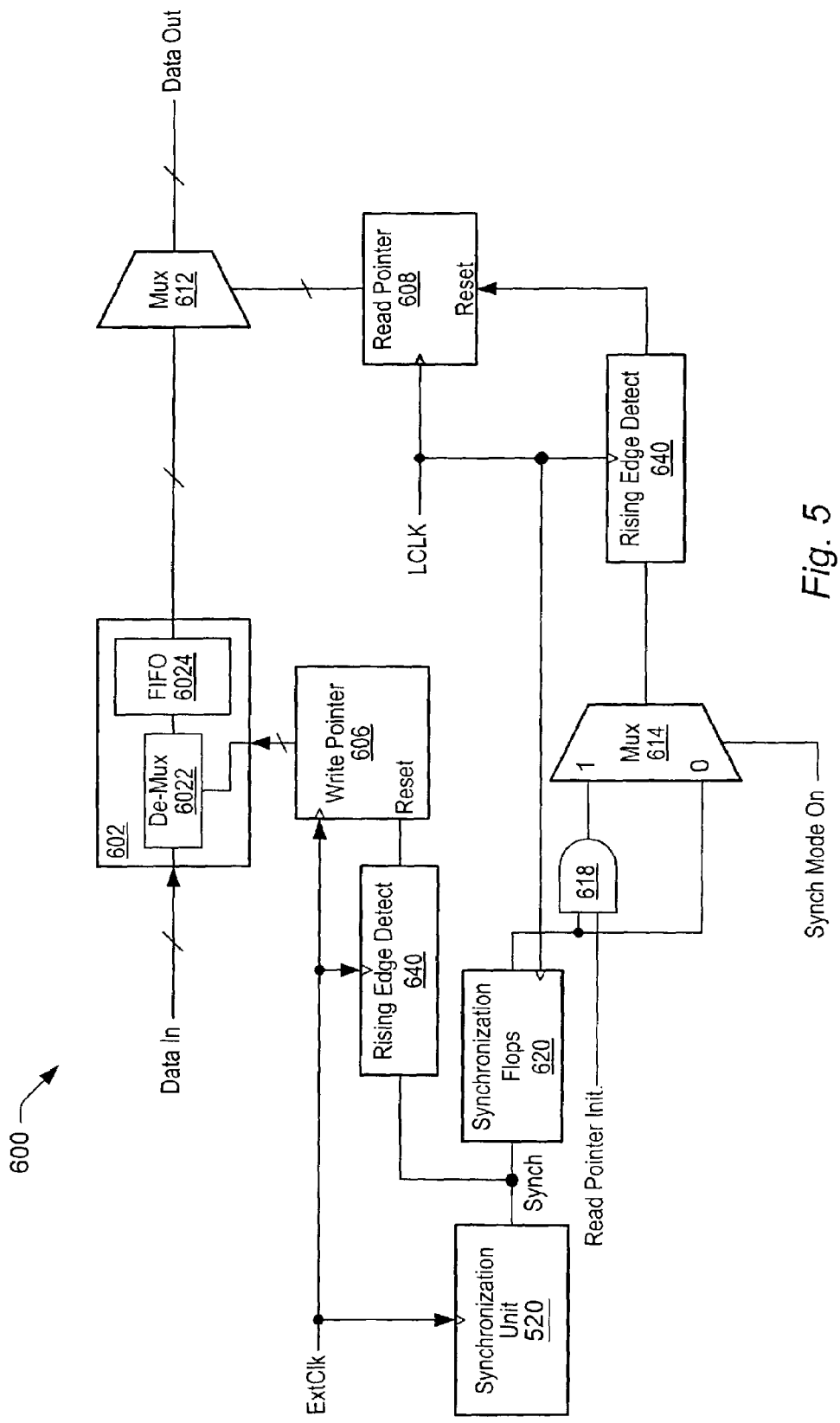
FIG. 5 is a block diagram of one embodiment of a data synchronization unit.

Moving now to FIG. 5, a block diagram of one embodiment of a data synchronization unit is shown. Data synchronization unit 600 includes a memory unit 602 which is configured to receive incoming data. As used herein, the term 'data' may include any information that is transmitted into the memory unit, and may include commands and/or other information as well as raw data.

In the embodiment shown, memory unit 602 includes a de-multiplexer 6022 and a first-in first-out (FIFO) memory 6024. Other embodiments are possible and contemplated for memory unit 602. Data may be received into de-multiplexer 6022 via one or more signal lines. De-multiplexer 6022 may then route the data into an address of FIFO memory 6024. The location in FIFO memory 6024 to which data is to be written may be controlled by write pointer 606, which is coupled to de-multiplexer 6022. The outputs from write pointer 606 may be used as select inputs to de-multiplexer 6022, thereby selecting the address in FIFO memory 6024 to which the data is to be written. In one embodiment, write pointer 606 may be a counter, and may be synchronized to an external (or reference) clock signal.

An address from which data is to be read from FIFO memory 6024 may be routed through multiplexer 612 to a data output. Multiplexer 612 may be coupled to FIFO memory 6024 by multiple signal lines. The selection of the address from which data is to be read may be performed by read pointer 608. Outputs from read pointer 608 may be coupled to multiplexer 612 and thereby control the selection of the data which may appear on the multiplexer output. In one embodiment, read pointer 608 may be a counter, and may be synchronized to a local clock signal.

A synchronization unit 520, which may be similar to the synchronization unit 520 shown in FIG. 4, may also be included in data synchronization unit 600. Synchronization unit 520 of FIG. 5 may be configured to assert a synchronization pulse, which may propagate through synchronization flop unit 620 (which may receive the local clock signal) to AND gate 618. The synchronization pulse outputs from both synchronization unit 520 and synchronization flop unit 620 may remain in an active state (e.g. high for this embodiment) throughout the entire synchronization process, i.e. until the initialization of both the read and write pointers is complete. When asserted, the synchronization pulse from synchronization flop unit 620 may allow the capture and propagation of a read pointer initialization signal that is input into AND gate 618. Synchronization unit 520 may be synchronized to the external clock signal, while synchronization flop unit 620 may be synchronized to the local clock signal.

The read pointer initialization signal may be deterministically asserted once every certain number of external clock cycles. For example, in one embodiment, the read pointer initialization signal may be asserted once every 24 external clock cycles. Other embodiments are possible and contemplated (e.g. once every 10 clock cycles, once every 40 clock cycles, etc.). The frequency of occurrence of the read pointer initialization signal may be predetermined by the design of the specific embodiment of data synchronization unit 600.

A first rising edge detect circuit 640 may be coupled to the synchronization pulse output of synchronization unit 520. The first rising edge detect circuit 640 may be configured to detect the rising edge of the synchronization pulse when asserted by synchronization unit 520. An output pulse from the first rising edge detect circuit 640 may be received by a reset input of write pointer 606. Receiving the output signal from the first rising edge detection circuit 640 at the reset input may allow for a synchronous reset (i.e. initialization) of write pointer 606.

Data synchronization unit 600 may be configured to operate in a synchronization mode. The synchronization mode may be invoked by asserting a signal, shown here as Synch Mode On. When asserted, the Synch Mode On signal may select the output of AND gate 618 to propagate through multiplexer 614 to the reset input of read pointer 608. This may enable read pointer 608 to be reset subsequent to receiving a read pointer initialization pulse that captured when the synchronization pulse output from synchronization flop unit 620 is asserted. When not operating in the synchronization mode, read pointer 608 may be reset subsequent to an assertion of the output of synchronization flop unit 620. In either case, the signal propagating through multiplexer 114 may be received by a second rising edge detect circuit 640. The second rising edge detect circuit 140 may detect the rising edge of the signal output from multiplexer 614, and may in turn assert its own output signal. The output signal from the second rising edge detect circuit 640 may remain asserted for the duration of one local clock cycle in this particular embodiment. The output signal asserted by the second rising edge detection circuit 640 may be received by the reset input of read pointer 608, which may cause a synchronous reset to occur.

When operating in the synchronization mode, resetting read pointer 608 may result in a synchronizing the write pointer to the read pointer. Synchronizing write pointer 606 with read pointer 608 may include setting the location of data to be read from the memory to lag the location where data is written to the memory by one or more memory locations. The synchronization mode may be enabled when it is necessary to ensure that data is read from the memory a certain number of locations (and thus pointer cycles) behind when it is written. The synchronization mode may be enabled when it is necessary to ensure that data is read from the memory a certain number of locations (and thus pointer cycles) behind when it is written. For example, an assertion of the synchronization pulse may cause read pointer 608 to cause data to be at memory address 0 while write pointer 606 is causing data to be written to memory address 4. As both read pointer 608 and write pointer 606 continue to cycle, the next address read from may be address 1, while the next address written to may be address 5. As read pointer 608 continues to cycle, it may continue reading at an address that was written to four cycles previously. This relationship may be predefined by the design of the specific embodiment implemented. In one embodiment, the number of flops present in synchronization flop unit 620 may determine the predefined relationship. Thus it may be known that with each synchronization operation, relationship between writing data and reading data to/from FIFO 6024 is predetermined and always the same, regardless of any process, voltage, or temperature variations. Thus, using the example above, the reading of data from FIFO 6024 may lag the writing of data by 4 locations for this embodiment when the read and write pointers are initialized in the synchronization mode. Periodic assertion of the read pointer initialization signal, as discussed above, may ensure that the read pointer remains synchronized with the write pointer according to the predetermined relationship.

Setting read pointer 608 such that the reading of data lags the writing of data by one or more memory addresses may ensure that the data read from the memory is valid. Valid data may be defined as data having the necessary electrical characteristics for its proper reading. These electrical characteristics may include (but are not limited to) setup time and hold time. Furthermore, the ability to synchronize read pointer 608 and write pointer 606 to a known (i.e. predefined) relationship may allow easier creation of test vectors for testing an integrated circuit in which synchronization unit 600 is implemented.

The synchronization mode may be useful to ensure that the relationship between the reading and writing of data from FIFO memory 6024 is predefined and known at power up of the integrated circuit in which data synchronization unit 600 is implemented. Furthermore, synchronizing the write pointer to the read pointer according to the predefined relationship may also guarantee sufficient setup and hold time are sufficient for reading the data from the FIFO after it has been written, thus ensuring its validity.

Other embodiments of data synchronization unit 600 are possible and contemplated. Such embodiments may allow the reading of data to lag the writing of data by a greater or lesser number of addresses. The number of addresses which the reading of data lags may be determined by the number of flops in synchronization flop unit 620. The number of locations in FIFO 6024 may be considered when choosing the number of flops. In choosing the number of addresses in which the reading of data is to lag the writing of data, consideration may be given to the electrical characteristics and the possibility of overwriting. If the reading of data lags the writing of data by too few addresses, the setup and hold times may be insufficient to ensure that the data is valid when read. If the reading of data lags the writing of data by too many addresses, it may be possible that data is overwritten before it has an opportunity to be read.

Figure 6:
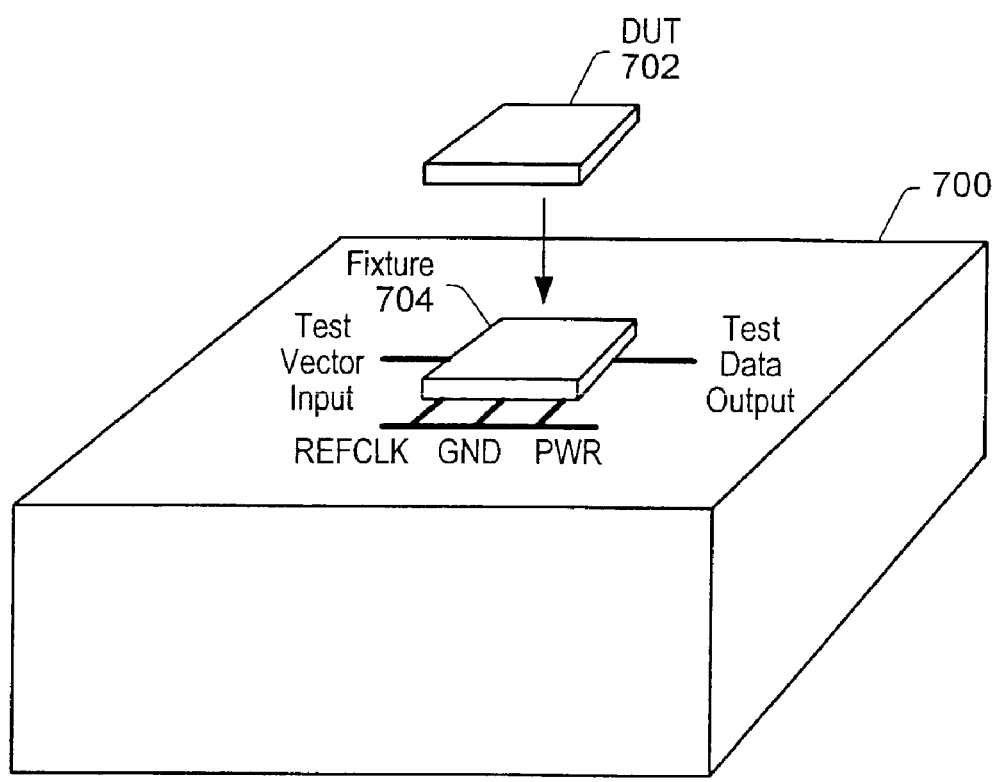
FIG. 6 is an illustration of one embodiment of an integrated circuit test system.

Turning now to FIG. 6, an illustration of one embodiment of an integrated circuit test system is shown. Data synchronization unit 600 may be used to provide data synchronization during the testing of an integrated circuit (IC) in which it is implemented. As used with respect to this drawing, the term "data synchronization" refers to the reading of test data, produced responsive to input test vectors, at the appropriate time or clock cycle. During the reading and writing of data, it may be possible for cycle slippage to occur. Cycle slippage may occur when the number of addresses by which the reading of data lags the writing of data increases (e.g. during operation, address lag increases from 4 to 5). Cycle slippage may or may not be a significant factor during normal chip operations in a computer system, as traffic between devices is often times subject to interrupts, arbitration, and so on. On the other hand, cycle slippage may be critical during production test of an IC, as the response to test vectors input into a chip must be read by a tester at a certain predetermined time. Cycle slippage may cause the response to test vectors to be read by a tester one or more clock cycles later than intended, which may result in a false failure of the device under test. False failures may in turn result in the need to retest parts, or in some cases, may lead to the scrapping of otherwise good parts. Thus, data synchronization unit 600 may, in the synchronization mode, prevent cycle slippage that may in turn prevent false failures, by guaranteeing a pre-defined relationship between the writing and reading of data to/from FIFO 6024 as described above.

Test system 700 may be configured to perform testing on device under test (DUT) 702. In one embodiment, DUT 702 may be an integrated circuit such as I/O node 20. In other embodiments, DUT 702 may be virtually any type of integrated circuit that may be tested on a production tester. DUT 702 may include a data synchronization unit such as that illustrated in FIG. 5. Test system 700 may include a test fixture 704, which may be configured to allow DUT 702 to be coupled to test system 700. Test fixture 704 may couple DUT 702 to power and ground connections. Test fixture 704 may also allow test system 700 to provide a reference clock signal to DUT 702.

Testing may be performed by inputting test vectors into DUT 702 and reading out test data, which may be produced responsive to the input test vectors. Comparison of the test data to expected results may be performed in order to determine whether DUT 702 has successfully passed the test. As noted above, data synchronization unit 600 may be placed in a synchronization mode during testing in order to ensure that false failures do not occur due to an inability to determine the relationship between the writing and reading of data in FIFO 6024. As previously noted, the relationship between read pointer and the write pointer upon initialization and synchronization may be predefined (e.g. read address always lags 4 addresses behind the write address) despite any process, voltage, or temperature variations. Similarly, the occurrence of the read pointer initialization pulse relative to the external clock signal (e.g. 1 read pointer initialization pulse every 24 external clock cycles) may also be known. This may allow for the easy creation of test vectors and more reliable testing of synchronization unit 600. Without the synchronization mode and supporting circuitry, the relationship between the reading and writing of data into a FIFO for a synchronization unit may not be deterministic, and thus this relationship may vary upon power-up with process, temperature, and voltage. Thus, the additional circuitry enabling operation in a synchronization mode as described herein and illustrated in the drawings may enable an integrated circuit having an embodiment of data synchronization unit 600 to power up with a known relationship between the reading and writing of data from the FIFO, thereby allowing a test system such as tester 700 to base tests on the known relationship.

It should also be noted that, while the synchronization mode of data synchronization unit 600 is particularly useful during testing, it may be employed at other times as well. In general, the synchronization mode may be turned on at any time when it is critical to read data from FIFO memory 6024 at a specific time or during certain clock cycles, or when it is necessary or useful to have a predefined relationship between the reading and writing of data from FIFO memory 6024 upon power up an integrated circuit in which it is implemented.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A data synchronization unit comprising:
    a memory unit including a memory, wherein the memory unit is configured to receive data from a source external to the data synchronization unit;
    a write pointer unit configured to specify an address in the memory where data is to be written to, wherein the write pointer unit is synchronized to an external clock signal generated external to the data synchronization unit;
    a read pointer unit configured to specify an address in the memory where data is to be read from, wherein the read pointer unit is synchronized to a local clock signal, and wherein the local clock signal is generated internal to the data synchronization unit; and
    synchronization pulse logic, wherein the synchronization pulse logic is configured to, in a synchronization mode, to assert a synchronization pulse, wherein asserting the synchronization pulse synchronizes the write pointer to the read pointer, wherein synchronizing includes setting the location of data to be read from the memory to lag the location where data is written to the memory by a predefined number of memory locations.

2. The data synchronization unit as recited in claim 1, wherein the read pointer is a first counter, wherein the first counter is configured to receive the local clock signal.

3. The data synchronization unit as recited in claim 2, wherein the data synchronization unit, when operating in a synchronization mode, is configured to drive a reset pulse to the counter responsive to asserting the synchronization pulse and a read pointer initialization pulse.

4. The data synchronization unit as recited in claim 3, wherein the data synchronization unit, when not operating in the synchronization mode, is configured to drive a reset pulse to the first counter responsive to asserting the read pointer initialization pulse.

5. The data synchronization unit as recited in claim 1, wherein the memory is a first-in first-out (FIFO) memory, and wherein the memory unit further includes a de-multiplexer, wherein the de-multiplexer is coupled to the FIFO and the write pointer unit.

6. The data synchronization unit as recited in claim 5 further comprising a multiplexer coupled to an output of the FIFO, and wherein the multiplexer is further coupled to the read-pointer unit.

7. The data synchronization unit as recited in claim 1, wherein the synchronization pulse logic is coupled to a second counter, and wherein the second counter is configured to receive the external clock signal.

8. The data synchronization unit as recited in claim 7, wherein the synchronization pulse logic is configured to assert the synchronization pulse when the second counter output reaches a pre-specified value.

9. The data synchronization unit as recited in claim 1, wherein synchronizing the write pointer to the read pointer further includes guaranteeing the electrical characteristics of data stored in the memory are such that the data is valid when read.

10. The data synchronization unit as recited in claim 9, wherein said electrical characteristics include setup time.

11. The data synchronization unit as recited in claim 9, wherein said electrical characteristics include hold time.

12. A method for synchronizing clocks in a data synchronization unit, the method comprising:
writing data to a memory, wherein the data is written to an address specified by a write pointer unit, and wherein the write pointer unit is synchronized to an external clock signal;
reading data from the memory unit, wherein the data is read from an address specified by a read pointer unit, and wherein the read pointer unit is synchronized to a local clock signal;
asserting a synchronization pulse, said asserting performed by a synchronization unit; and
synchronizing the write pointer and the read pointer, wherein said synchronizing includes setting the location of data to be read from the memory to lag the location where data is written to the memory by a predefined number of memory locations.

13. The method as recited in claim 12, wherein the read pointer unit is a first counter, and wherein the address is specified by the first counter outputs, and wherein the counter is configured to receive the local clock signal.

14. The method as recited in claim 13 further comprising resetting the counter responsive to asserting a read pointer initialization pulse and the synchronization pulse.

15. The method as recited in claim 14, wherein the synchronization pulse is asserted by a synchronization pulse logic unit, and wherein the synchronization pulse logic unit is coupled to a second counter, and wherein the second counter is configured to receive the reference clock signal.

16. The method as recited in claim 15, wherein the synchronization pulse logic unit is configured to assert the synchronization pulse when the counter reaches a pre-specified value.

17. The method as recited in claim 12, wherein the memory is a first-in first-out (FIFO) memory, and wherein the FIFO memory is configured to receive data from a de-multiplexer coupled to the FIFO.

18. The method as recited in claim 17, wherein a multiplexer is coupled to the output of the FIFO, and wherein the multiplexer is further coupled to the read pointer unit.

19. The method as recited in claim 12, wherein said synchronizing further includes guaranteeing the electrical characteristics of data stored in the memory are such that the data is valid when read.

20. The method as recited in claim 19, wherein said electrical characteristics include setup time.

21. The method as recited in claim 19, wherein said electrical characteristics include hold time.

22. An input/output (I/O) node comprising:
an I/O tunnel configured to convey data transmissions in the I/O node; and
a receiver unit coupled to the I/O tunnel, wherein the receiver unit is configured to receive data transmissions from a bus coupled to the I/O node, wherein the receiver unit includes a data synchronization unit, the data synchronization unit comprising:
a memory unit, wherein the memory unit is configured to receive data from a source external to the CFF unit;
a write pointer unit configured to specify an address in the FIFO where data is to be written to, wherein the write pointer unit is synchronized to a reference clock signal, and wherein the reference clock signal is generated external to the CFF unit;
a read pointer unit configured to specify an address in the FIFO where data is to be read from, wherein the read pointer unit is synchronized to a local clock signal, and wherein the local clock signal is generated internal to the CFF unit; and
synchronization pulse logic, wherein the synchronization pulse logic is configured to, in a synchronization mode, to assert a synchronization pulse, wherein asserting the synchronization pulse synchronizes the write pointer to the read pointer, wherein synchronizing includes setting the location of data to be read from the memory to lag the location where data is written to the memory by a predefined number of memory locations.

23. The I/O node as recited in claim 22, wherein the read pointer is a first counter, wherein the first counter is configured to receive the local clock signal.

24. The I/O node as recited in claim 23, wherein the data synchronization unit, when operating in a synchronization mode, is configured to drive a reset pulse to the counter responsive to asserting the synchronization pulse and a read pointer initialization pulse.

25. The I/O node as recited in claim 24, wherein the data synchronization unit, when not operating in the synchronization mode, is configured to drive a reset pulse to the first counter responsive to asserting the read pointer initialization pulse.

26. The I/O node as recited in claim 22, wherein the memory is a first-in first-out (FIFO) memory, and wherein the memory unit further includes a de-multiplexer, wherein the de-multiplexer is coupled to the FIFO and the write pointer unit.

27. The I/O node as recited in claim 26, further comprising a multiplexer coupled to an output of the FIFO, and wherein the multiplexer is further coupled to the read-pointer unit.

28. The I/O node as recited in claim 22, wherein the synchronization pulse logic is coupled to a second counter, and wherein the second counter is configured to receive the external clock signal.

29. The I/O node as recited in claim 28, wherein the synchronization pulse logic is configured to assert the synchronization pulse when the second counter output reaches a pre-specified value.

30. The I/O node as recited in claim 22 wherein synchronizing the write pointer to the read pointer further includes guaranteeing the electrical characteristics of data stored in the memory are such that the data is valid when read.

31. The I/O node as recited in claim 30, wherein said electrical characteristics include setup time.

32. The I/O node as recited in claim 31, wherein said electrical characteristics include hold time.

33. The I/O node as recited in claim 22, wherein the I/O node includes a transceiver unit, wherein the transceiver unit includes the receiver unit.

34. The I/O node as recited in claim 33, wherein the transceiver unit is configured to be coupled to a packet bus.

35. The I/O node as recited in claim 33, wherein the I/O node includes a peripheral bus interface, wherein the peripheral bus interface is configured to coupled to a peripheral bus.

36. The I/O node as recited in claim 35, wherein the I/O node includes an I/O tunnel, wherein the peripheral bus interface and the transceiver unit are each coupled to the I/O tunnel.

* * * * *